United States Patent
Solin et al.

(10) Patent No.: US 9,094,217 B2
(45) Date of Patent: Jul. 28, 2015

(54) SECURE CREDENTIAL STORE

(71) Applicant: BladeLogic, Inc., Houston, TX (US)

(72) Inventors: David Allen Solin, Austin, TX (US); Richard Guoyu Liao, Cupertino, CA (US)

(73) Assignee: BLADELOGIC, INC., Houston, TX (US)

( * ) Notice: Subject to any disclaimer, the term of this patent is extended or adjusted under 35 U.S.C. 154(b) by 0 days.

(21) Appl. No.: 13/958,283

(22) Filed: Aug. 2, 2013

(65) Prior Publication Data

US 2013/0311773 A1 Nov. 21, 2013

Related U.S. Application Data

(62) Division of application No. 12/582,948, filed on Oct. 21, 2009, now Pat. No. 8,510,810.

(60) Provisional application No. 61/140,390, filed on Dec. 23, 2008.

(51) Int. Cl.
*G06F 21/33* (2013.01)
*H04L 9/32* (2006.01)
*H04L 9/00* (2006.01)
*H04L 9/08* (2006.01)
*G06F 21/62* (2013.01)

(52) U.S. Cl.
CPC .............. *H04L 9/3268* (2013.01); *H04L 9/006* (2013.01); *H04L 9/0894* (2013.01); *H04L 2209/805* (2013.01)

(58) Field of Classification Search
CPC ..... G06F 21/33; G06F 21/62; G11B 20/0084; H04L 63/0407; G06Q 20/40
See application file for complete search history.

(56) References Cited

U.S. PATENT DOCUMENTS

| | | | |
|---|---|---|---|
| 6,304,974 B1 | 10/2001 | Samar | |
| 6,393,563 B1 * | 5/2002 | Maruyama et al. | 713/155 |
| 2001/0052071 A1 | 12/2001 | Kudo et al. | |
| 2003/0196084 A1 * | 10/2003 | Okereke et al. | 713/156 |
| 2005/0289644 A1 | 12/2005 | Wray | |
| 2006/0168444 A1 | 7/2006 | Miller et al. | |
| 2007/0118892 A1 | 5/2007 | Sastry et al. | |
| 2007/0266246 A1 * | 11/2007 | Lee et al. | 713/168 |
| 2007/0294750 A1 | 12/2007 | Burch et al. | |
| 2008/0028206 A1 * | 1/2008 | Sicard et al. | 713/156 |
| 2008/0104401 A1 * | 5/2008 | Miyamoto et al. | 713/175 |

OTHER PUBLICATIONS

The MyProxy online credential repository. Basney et al. Software-Pratice and Experience(2005).*
Restriction Requirement for U.S. Appl. No. 12/582,948 dated Aug. 15, 2012, 6 pages.
Non-Final Office Action for U.S. Appl. No. 12/582,948 dated Oct. 3, 2012, 12 pages.
Final Office Action for U.S. Appl. No. 12/582,948 dated Feb. 25, 2013, 12 pages.
Notice of Allowance for U.S. Appl. No. 12/582,948 dated Apr. 26, 2013, 8 pages.

* cited by examiner

*Primary Examiner* — Venkat Perungavoor
(74) *Attorney, Agent, or Firm* — Brake Hughes Bellermann LLP

(57) ABSTRACT

A credential store provides for secure storage of credentials. A credential stored in the credential store is encrypted with the public key of a user owning the credential. A first user may provide a credential owned by the first user to a second user. The first user may add credentials owned by the first user to the credential store. An administrator may manage users of the credential store without having the ability to provide credentials to those users.

19 Claims, 6 Drawing Sheets

SECURE CREDENTIAL STORE

CROSS REFERENCE TO RELATED APPLICATIONS

This application is a divisional of U.S. application Ser. No. 12/582,948, filed Oct. 21, 2009 which claims priority to U.S. Provisional Application Ser. No. 61/140,390 entitled "Secure Credential Store" filed Dec. 23, 2008 and which are incorporated by reference in their entirety herein.

BACKGROUND

This disclosure relates generally to the field of computing systems. More particularly, but not by way of limitation, it relates to techniques for allowing access to computer systems.

Automation products perform tasks on a variety of different computer systems. Various systems have been developed to provide what is known as "Single Sign-On" (SSO) capability, allowing a user to provide authentication information once, typically a user id and a password, then gain access to other systems without being prompted to login again at each of the other systems. These various SSO systems have been in practice incapable of providing complete coverage for all computer systems of an enterprise, particularly where those systems are provided by different vendors, with varying authentication systems, so that the different systems cannot be integrated into an enterprise-wide SSO security architecture.

Some products available today attempt to deal with the problem by encoding passwords using simple encodings, such as Base64, then passing these encoded passwords to the different systems as needed. Other products encrypt all passwords in a single place, using a single key, making an attack on the single place particularly attractive.

SUMMARY

In one embodiment, a method is disclosed. The method comprises inserting a first credential in a credential store of a credential server computer, wherein the first credential is encrypted with a public key corresponding to a first user of the credential store. The first credential is provided to a second user at the request of the first user by retrieving the first credential; decrypting the first credential with a private key of the first user; encrypting the decrypted first credential with a public key of the second user; and making the encrypted credential available to the second user.

In another embodiment, a computer readable medium is disclosed. The medium has instructions stored on it for a credential server computer that when executed cause the credential server computer to perform the method described above.

In yet another embodiment, a credential store system is disclosed. The credential store system comprises a credential server. The credential server comprises a processor; a credential store configured to store credentials, coupled to the credential store server, and further configured to store a plurality of keychains and a plurality of resource chains; and a program store coupled to the credential server processor and configured to store instructions wherein the instructions cause the processor to perform the method described above.

In still another embodiment, a networked computer system is disclosed. The networked computer system comprises a first computer; a second computer; and a credential store computer. The credential store computer comprises a processor; a credential store configured to store credentials, coupled to the credential store server, and further configured to store a plurality of keychains and a plurality of resource chains; and a program store coupled to the credential server processor and configured to store instructions wherein the instructions cause the processor to perform acts. The acts comprise: retrieving an encrypted credential from the credential store on behalf of a first user of the first computer; decrypting the encrypted credential; using the encrypted credential to authenticate an action on the second computer on behalf of the first user; inserting a first credential in the credential store, wherein the first credential is encrypted with a public key corresponding to the first user; and providing the first credential to a second user at the request of the first user. The act of providing the first credential to a second user comprises retrieving the first credential; decrypting the first credential with a private key of the first user; encrypting the decrypted first credential with a public key of the second user; and making the encrypted credential available to the second user.

In another embodiment, a method is disclosed. The method comprises Inserting a credential in a credential store of a credential server computer, wherein the credential is encrypted with a public key corresponding to a first user of the credential store; receiving an instruction to provide the credential; decrypting the first credential with a private key of the first user; encrypting the first credential with a single use key; storing the single use key encrypted credential at a location; making the single use key encrypted credential available at the location during a time window; and removing the single use key encrypted credential from the location at the expiration of the time window.

DETAILED DESCRIPTION

Figure 1:
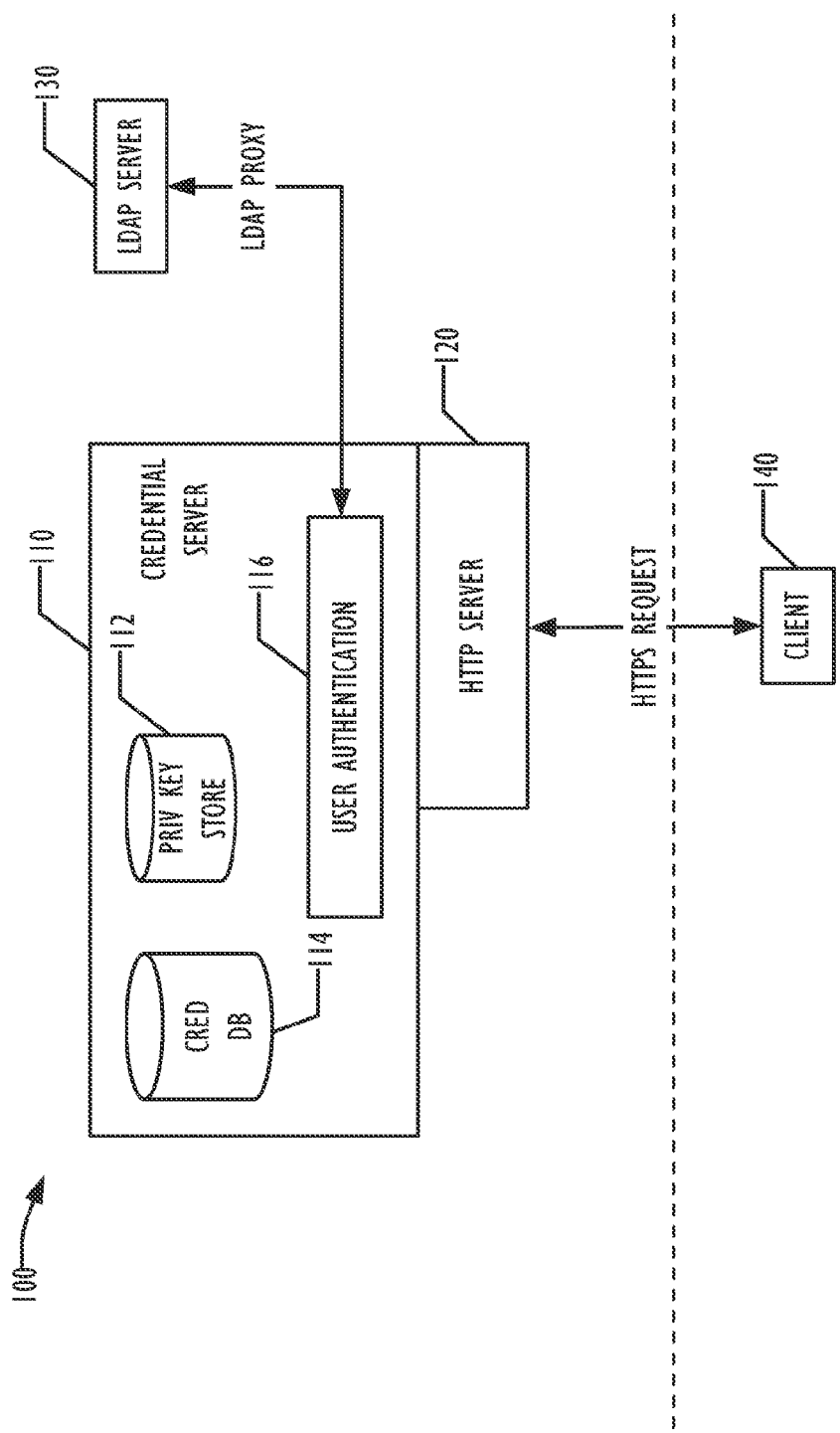
FIG. 1 shows, in block diagram form, a high-level view of one embodiment of a secure credential store architecture.

Various embodiments disclosed herein provide a secure credential store that can be used for on-demand and scheduled retrieval of credentials that may be used to access computer systems. Some embodiments allow on-demand access by the user directly. Other embodiments may provide a way for an automation platform to retrieve credentials to allow access to computer systems on behalf of a user who has scheduled the execution of an automated task. Some embodiments may provide both on-demand and scheduled access using the credentials store. Although the description of embodiments herein is written in the context of a credential store that stores login credentials for computer systems, the present invention is not so limited, but may be employed to provide secure access to information of any kind.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

A centralized credential store may provide a solution to the enterprise SSO (ESSO) problem. But such a credential store should not introduce risks that might compromise the security either of the credential store or the systems protected by the credentials stored in the credential store. Instead, a credential store such as described herein should be highly resistant to malicious attack, both from internal users and external users. Furthermore, it should be capable of integration with a wide variety of authentication systems, including remote authentication systems, and provide an interface that is usable by programmers with limited familiarity with public key encryption.

The embodiments disclosed herein are resistant to attack because unlike many computer systems, no single user is required to have access to all of the credentials stored in the system, thus eliminating a single attack point which, if breached, could allow access to all of the credentials. In addition, embodiments may not supply a credential to a user who does not have a personal copy of the credential, providing a degree of built-in access control capability.

In one embodiment, a system comprising a credential store utilizes an external public key infrastructure (PM). In another embodiment, an integrated PKI keystore is employed by the credential store.

Various embodiments employ a schema comprising users, groups of users, resources, cryptographic hashes or digests of stored credentials that may be associated with resources, and encrypted copies of credentials that may be associated with both resources and individual users.

Users in the schema may be pointers to users that are defined in an external directory, such as Lightweight Directory Access Protocol (LDAP). In the case of an integrated PKI, the store may maintain a certificate pair for each user, with the private key being encrypted using that user's external credential. The system may decrypt the key on behalf of the user when he authenticates through the store as a proxy to the external directory. In the case of an external PKI, the user's private key is maintained elsewhere—such as in a smart card in the user's possession—and the store only has a copy of his public key.

User groups in the schema may also be pointers to externally defined groups of users, such as those defined in LDAP. Credentials may be assigned to user groups by associating an abstract resource credential with the group. Resources in the schema may be pointers to configuration management database (CMDB) configuration items (CI) class instances, or they may be internal to the store. In either case, they typically identify a resource that requires credentialed access.

Resource credentials may be stored in the schema in encrypted form, with a separate copy for each authorized user encrypted using theft public key. As an optimization, some embodiments of the system may verify that the user's copy is current by checking its decrypted form against a digest that it has stored for the credential.

Any user may potentially add a resource credential to the credential store that the user may obtain from a source external to the credential store. Any user may also create copies of credentials owned by the user in the credential store and make them available for other users using those users' public keys. A user may only access credentials in the credential store that the user already owns in the credential store.

In one embodiment, an administrator may assign or delegate change authority for any resource credential, or revoke any user's access to a credential (by deleting that user's copy) without the administrator being able to decrypt it. An administrator may not grant a user access to a credential. Instead, some user who already has a copy of the credential must create a copy for the user desiring access to it. Thus, hacking the administrator's account does not give the hacker the keys to the "kingdom," since the administrator cannot grant access to an arbitrary resource to anyone, including the administrator.

It may not be desirable to have passwords transmitted over the network in the clear, so connections may be implemented using Transport Layer Security (TLS). Extensive use of certificate mappings may also be desirable. The data store may generate a keychain for each user that it stores in some form of persistent storage; the keychain could be encrypted using that user's public key, with the user's private key being secured within the store using the user's LDAP password in one embodiment. In that embodiment, the data store proxies the user's authentication to LDAP, so that the credential store can intercept the user's password to decrypt his keychain. Thus, the credential store in this embodiment may decrypt credentials to resources that the user is permitted to access. In one embodiment, to prevent Trojan processes from being able to read unencrypted passwords in memory, the credential store may reside on its own physical machine, running a highly secure, stripped-down kernel that will only execute digitally-signed code.

FIG. 1 is a block diagram illustrating one embodiment of a secure credential store architecture. The system 100 provides a partitioned set of controls on the credential information used to access other computer systems to prevent access to the entire collection of stored credentials with a single attack, while also being able to delegate authority based on a "need to know" model similar to that believed used in intelligence systems.

As illustrated in FIG. 1, the system 100 comprises a credential server system 110 and a hypertext transport protocol (HTTP) server 120. The credential server 110 and the HTTP server 120 may be software that is executed on a single or multiple computer hardware systems.

The credential server 110 may provide user authentication to the credential server 110 with a user authentication component 116. Typically, a user desiring access to the credential server 110 may be first authenticated using a user ID and password supplied by the user. In one embodiment, the user authentication component 116 may comprise a lightweight directory access protocol (LDAP) proxy to intercept the information provided to an LDAP server 130 for use in this regard.

Other components of the credential server 110 may include a credential database 112 and a private key store 114 described in more detail below.

One interface to the credential server 110 may comprise a request/response protocol that sits on top of hypertext transfer protocol secure (HTTPS). In one embodiment, a Simple Object Access Protocol (SOAP) request is used for the request/response protocol. In another embodiment, a simpler extensible markup language (XML) request is made using basic HTTP Post requests. Other techniques for communicating with the credential server 110 may be used, including embodiments where the HTTP server 120 is replaced with another technique for communicating between the credential server 110 and a credential client 140.

The credential client 140 provides a way for a user to access the credential store 100 maintained by the credential server 110. The client 140 may be a web browser application or any other suitable application for sending and receiving requests and responses according to the request/response protocol.

In one embodiment, the credential server 110 has access to the private key of the user, stored in the private key store 112. In this embodiment, the private key in the private key store 112 may be protected by a password that must be supplied by the client 140 to access the private key. Other types of access protection may be used instead of a password, including tokens, multi-factor authentication schemes and other types of access control devices. Once authenticated to the private key store 112, the credential server 110 may then use the private key obtained from private key store 112 to decrypt the credentials obtained from the credential database 114, before returning the decrypted credentials to the client 140.

In another embodiment, the credential server 110 may not have a private key store 114. In this embodiment, the credential server 110 may obtain encrypted credentials from the credential database 114, returning the encrypted credentials to the user. The user may then decrypt the credentials with the user's private key, The private key store 112 of FIG. 1 may be absent in this embodiment.

In both of these embodiments, the credential server 110 returns credentials to the client 140, which may then use the credentials for authentication. In yet another embodiment, the credential server 110 retrieves the credentials from the credential database 114, but instead of returning the credentials to the client 140, the credential server 110 may perform authentication on behalf of the client 140. In this embodiment, the credential server 110 may either receive the user's private key from the client 140 or obtain the private key from the private key store 112, and decrypt the credentials before using them for authentication.

In one embodiment, users of the credential store 100 may be assigned to groups. A user may belong to one or more groups. An administrator of the credential store 100 may provide management of the credential store 100, performing functions comprising one or more of: adding a user, deleting a user, assigning a user to a group, and deleting a user from a group.

In one embodiment, a keychain may be used to logically group credentials. Keychains may refer to other keychains, In one embodiment, keychain cycles may be prohibited and keychains may refer to other keychains, but those keychains may not refer to yet other keychains. Keychains may facilitate administrators managing resource accessibility.

Figure 2:
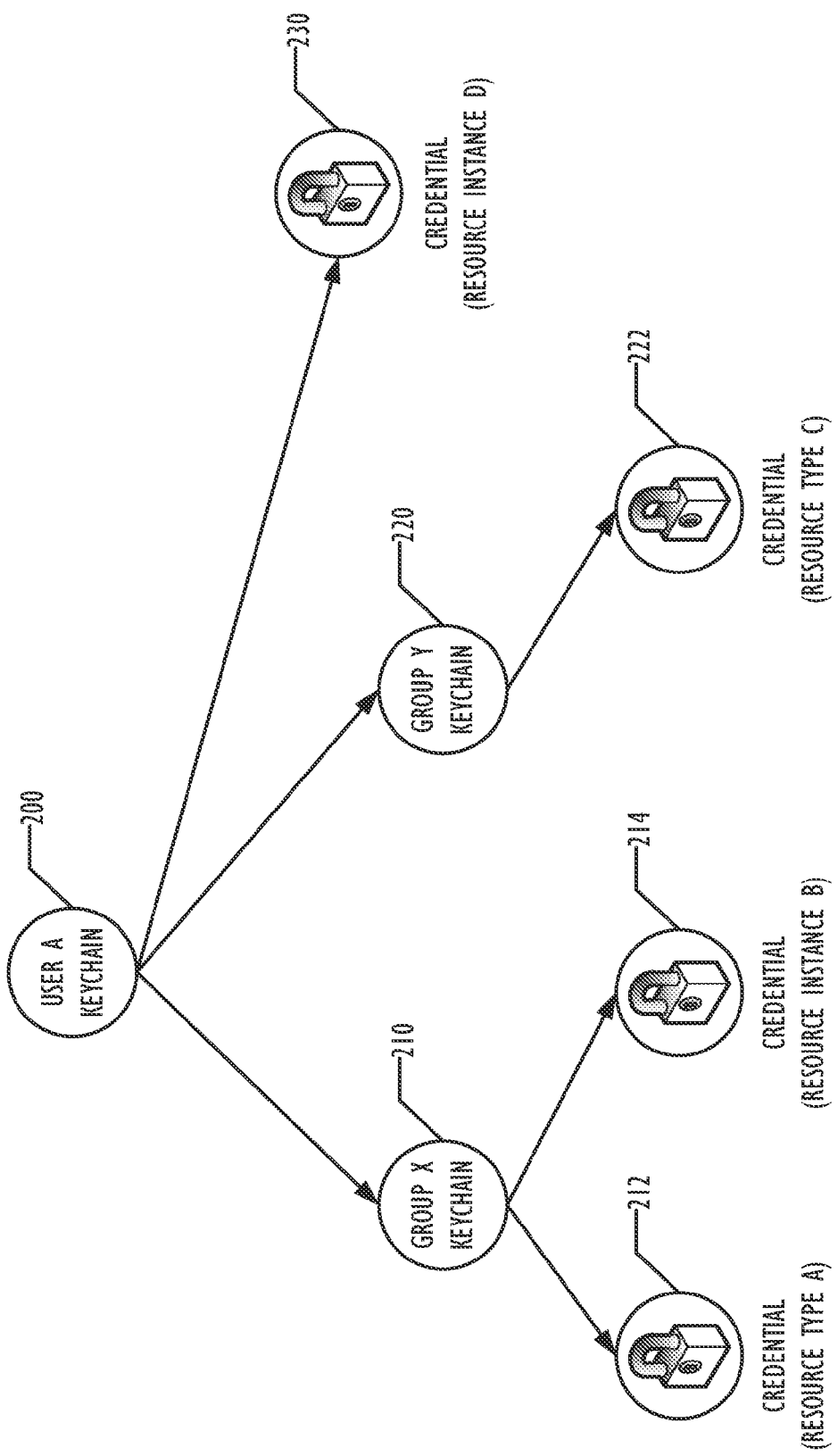
FIG. 2 shows, in graph form, an embodiment of a keychain.

FIG. 2 is a graph illustrating a keychain according to one embodiment. The user keychain 200 is a keychain associated with user A in this example. User A is a member of two groups, the Group X and Group Y, User A's keychain 200 thus comprises a User A copy of the Group X keychain 210, in which each credential has been encrypted with User A's private key, and a User A copy of the Group Y keychain 220, similarly encrypted. User A's keychain may also include a specific credential 230 that is not part of a group keychain.

User A's copy of the Group X keychain 210 comprises two credentials 212 and 214. User A's copy of the Group Y keychain 220 comprises a single credential 222.

Although an administrator may add or delete User A and assign User A to or remove User A from one or more groups, the administrator may not be able to add credentials to User A's keychain. The administrator may be able to add resources to User A's keychain that will later be associated with credentials as described below.

Using the example of Group X, an administrator may add User A to the credential store 100, create Group X, and assign User A to Group X, but the administrator (assuming the administrator is not a member of Group X) may not create copies of the credentials to the resources to which Group X is permitted access to User A's keychain. In one embodiment, however, the administrator may delete credentials from User A's keychain.

In order to obtain the credentials relevant to Group X, User A may obtain them from User B, a pre-existing member of Group X. User B may give User A copies of Group X credentials owned by User B. User B obtains credentials to be given to User A from User B's keychain in the credential store 100, decrypts them using User B's private key, then encrypts the credentials with User A's public key. User B may then add the credentials to User A's keychain in the credential store 100, or provide the credentials directly to User A.

Figure 3:
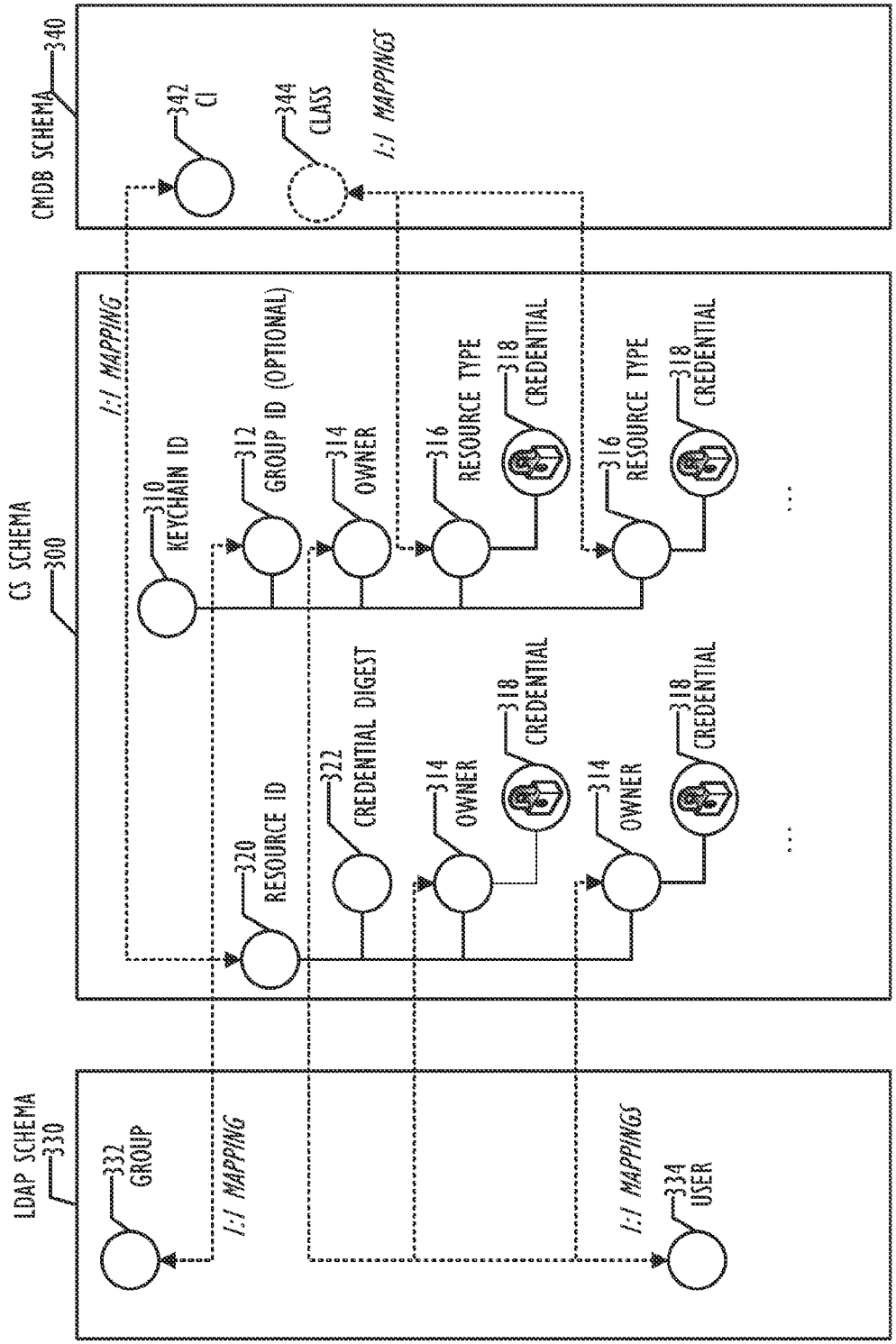
FIG. 3 shows, in block diagram form, an embodiment of schemas for organizing a credential database.

In one embodiment, the credential database 114 is organized using one or more schemas. FIG. 3 illustrates example schemas according to one embodiment, One view of credential store schema 300 comprises keychains and resource chains. A keychain may comprise a keychain ID 310, to which may be linked an optional group identifier 312, an owner 314, and a number of resources 316, each of which may be linked to a credential 318.

Another view of the schema 300 may be a resource chain. As illustrated in the example of FIG. 3, a resource identifier 320 is linked to own or more owners 314, and the owners 314 may be linked to one or more credentials 318 owned by that owner for the resource identified by resource identifier 320. Each credential 318 may be stored encrypted with the private key of the owner 314, so that even though the unencrypted credential may be the same for each owner 314, the stored copies of the credentials 318 are different for each owner 314.

In one embodiment, the resource chain may also comprise a credential digest 322. The credential digest 322 may be created by hashing or digesting an unencrypted credential 318 using any desirable one-way hashing or digesting technique, one example of which is the SHA-256 secure hash algorithm defined by Federal Information Processing Standard No. 180-2. Any user may then compare the user's private copy of the credential 318 by decrypting the credential 318, hashing the decrypted credential 318, then comparing the result with the stored credential digest 322. This allows a way for one of a group of users sharing a credential to change that user's copy, then update the credential digest 322. Other users in the group may then be able to discover that theft copy of the credential 318 is now obsolete and request the user making the change to send them the updated credential, without causing authentication failures in the external resource.

In one embodiment, resources may be either resource types or resource instances. A resource type comprises a generic resource, such as "remote login via secure shell" (SSH) that does not indicate a specific machine or software system to which it applies. A resource instance comprises a specific resource, such as "SSH access to Win32 host mpl-rsx-vm01 at IP address 127.0.133.5, port 777." A resource type may be useful when a single credential allows access to multiple computer systems or applications.

As indicated by FIG. 3, in one embodiment, the credential store 100 may be used in concert with a configuration management database (CMDB) 340. In one embodiment, the resource types 316 of a keychain may be mapped to a class element 344 of the CMDB 340, while a resource, identified by resource ID 320, may be mapped to a configuration item (CI) 342 of the CMDB 340. A CI 342 is a software model that describes the attributes of the represented entity being managed by the CMDB 340. A CI may be represent physical objects, for example, hardware or software items, or may be a logical abstraction, for example a business model or a distributed application. Thus, mapping resources in the credential store 100 to C is 342 in a CMDB may be useful to enhance the ability of the CMDB 340 to automate management of resources enterprise-wide.

In one embodiment, the groups identified in a keychain by group ID 312 may be mapped to a group 332 in an LDAP schema 330. Similarly, users 334 in the LDAP schema 330 may be mapped to credential owners 314 in the credential store schema 300.

An example of an embodiment using a private key store 112 such as is illustrated in FIG. 1 is one in which the private key store is implemented using a JAVA key store implementation such as the JCEKS, part of the Java Cryptography Extension (JCE), available from Sun Microsystems, Inc, (JAVA is a registered trademark of Sun Microsystems, Inc.)

Software applications in the client 140 may interact with the credential server 110 through application programming interfaces (APIs). In one embodiment, the APIs may be divided into four categories: User Authentication, User Management, Resource Management, and Keychain Management.

User Authentication APIs allow authenticating a user to the credential server 110. In one embodiment, a user ID and password are provided to the API, and if successful the password may be used to decrypt the user's private key, stored in the private key store 112.

User Management APIs typically comprise APIs for managing users' certificate information. For example, APIs in this category may allow adding users, storing the public/private key pair corresponding to the user, and encrypting the private key with the password supplied during user authentication. Additional example APIs may comprise listing users stored in the credential store 100, obtaining information about a user from the credential store 100, updating user information, and deleting a user. In one embodiment, an API may allow updating the private/public key pair for a user, and automatically decrypting credentials owned by that user and re-encrypting them with the new private key.

Resource Management APIs typically comprise APIs for managing resources. For example, APIs in this category may allow creating resources (either resource types or resource instances), retrieving resources for which a user in a session with the credential server 110 has credentials, activating or deactivating resources, updating resources, and deleting resources.

Keychain Management APIs typically comprise APIs for managing keychains. For example, APIs in this category may allow creating a keychain, which is initially empty with no resources or credential associated with it. Additional example APIs may comprise reading keychains, including obtaining credential information, updating keychains, and deleting keychains, Updating keychain APIs may comprise including adding credentials to keychains and removing credentials from keychains, updating credentials, copying keychains, revoking keychains, and activating and deactivating credentials in a keychain. In one embodiment, an API may allow updating a credential in a keychain, by finding all user copies of the keychain and updating the credential. This may involve decrypting the credential using the private key of the user requesting the update, and replacing the credentials in the various user keychains with new copies that are encrypted with the other users' public keys.

In one embodiment, multiple credentials may be included in a keychain for a given resource that are usable by a given user. In that embodiment, one of the multiple credentials may be indicated as a default credential, allowing the user to obtain the default credential for the resource, or to specify a specific non-default credential to be obtained when desired.

Figure 4:
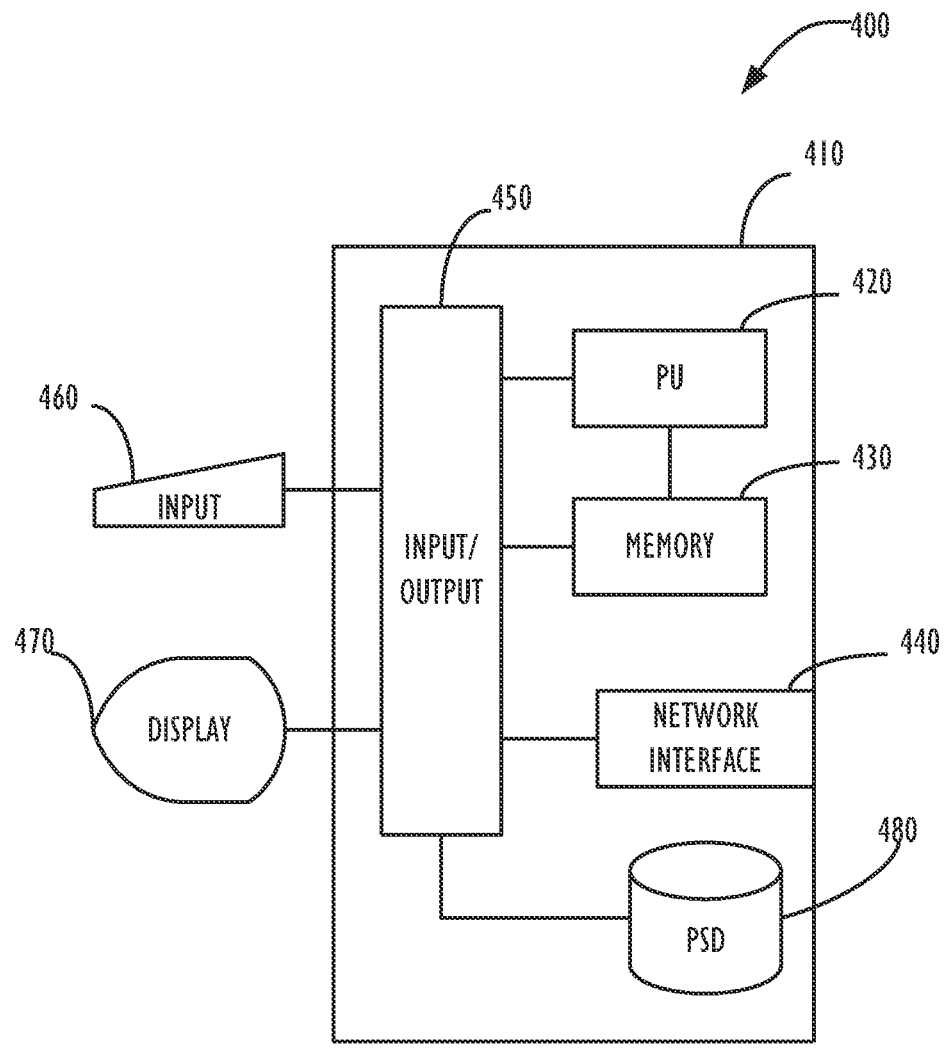
FIG. 4 shows an example computing device used for the credential server or client according to one embodiment.

Referring now to FIG. 4, an example credential store computer system 400 is shown. Example credential store computer system 400 comprises a system unit 410 which may be optionally connected to an input device or system 460 (e.g., keyboard, mouse, touch screen, etc.) and display 470. A program storage device (PSD) 480 (sometimes referred to as a hard disc) is included with the system unit 410. Also included with system unit 410 is a network interface 440 for communication via a network with other computing and corporate infrastructure devices (not shown). Network interface 440 may be included within system unit 410 or be external to system unit 410. In either case, system unit 410 will be communicatively coupled to network interface 440. Program storage device 480 represents any form of non-volatile storage including, but not limited to, all forms of optical and magnetic storage elements including solid-state storage, including removable media, and may be included within system unit 410 or be external to system unit 410. Program storage device 480 may be used for storage of software to control system unit 410, data for use by the credential store system 400, or both.

Figure 5:
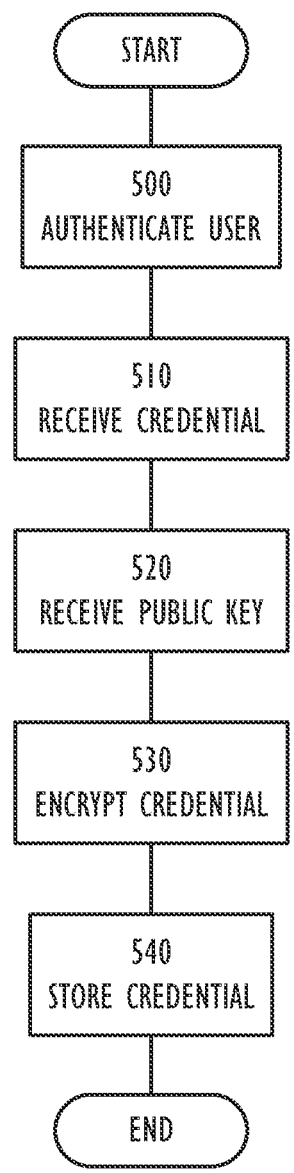
FIG. 5 shows, in flowchart form, a high-level view of a technique for storing a credential in a credential store according to one embodiment.
Figure 6:
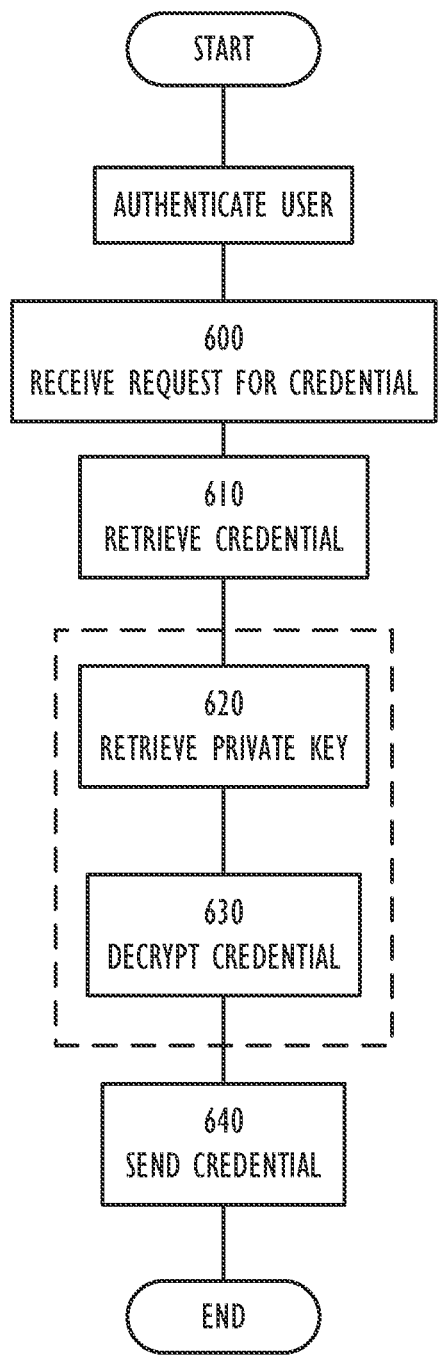
FIG. 6 shows, in flowchart form, a high-level view of a technique for retrieving a credential from the credential store according to one embodiment.

System unit 410 may be programmed to perform methods in accordance with this disclosure (examples of which are in FIGS. 4-6). System unit 410 comprises a processor unit (PU) 420, input-output (I/O) interface 450 and memory 430. Processing unit 420 may include any programmable controller device including, for example, one or more members of the Intel Core®, Pentium® and Celeron® processor families from the Intel and the Cortex and ARM processor families from ARM. (INTEL, CORE, PENTIUM, and CELERON are registered trademarks of the Intel Corporation. CORTEX is a registered trademark of the ARM Limited Corporation. ARM is a registered trademark of the ARM Limited Company,) Memory 430 may include one or more memory modules and comprise random access memory (RAM), read only memory (ROM), programmable read only memory (PROM), programmable read-write memory, and solid-state memory. One of ordinary skill in the art will also recognize that PU 420 may also include some internal memory including, for example, cache memory.

A similar computer system may be used for the client 140.

FIGS. 5 and 6 are flowcharts that illustrate the basic flow of adding credentials to the credential store 100, and accessing stored credentials. In FIG. 5, the credential server 110 authenticates a user requesting a credential session from the client 140 in block 500. In block 510, assuming the authentication is successful, the credential server 110 receives a credential to be stored in the credential database 114. In block 520, the credential server 110 receives the public key of the user. In one embodiment, the public key may be obtained from within the credential store. In other embodiments, the public key is obtained from an external directory. In block 530, the new (or updated) credential is encrypted using the user's public key. Finally, in block 540, the encrypted credential is stored in the credential database 114.

FIG. 6 illustrates a technique for retrieving a credential from the credential store 100 according to one embodiment. In block 600, the credential server 110 authenticates a user requesting a credential session from the client 140. In block 610, the credential requested (assuming it exists) is retrieved from the credential database 114. Then in block 640, the credential is sent to the requesting user. Blocks 620 and 630, enclosed in dashed lines, indicated a further embodiment in which the private key store 112 may provide the user's private key, based on the authentication information received from the user in block 600. In this embodiment, in block 620, the credential server 110 may retrieve the private key, which is decrypted in block 630 before sending it in block 640. As indicated above, the act of sending the credential in block 640 may be to send it to the requesting user, or may in some embodiments be providing the credential for authentication of the user to another computer system, so that the requesting user does not ever receive the credential from the credential store 100.

Thus, the credential store has access to all the unencrypted credentials to resources that user is permitted to access. To keep a Trojan process from reading any unencrypted passwords in memory it may be desirable for the credential server 110 to reside on its own physical machine, running a highly secure, stripped-down kernel that will only run digitally-signed code.

Automated, unattended retrieval of credentials is possible in an embodiment described as follows. Suppose a user wants to schedule a task for some future time, and that task requires the use of a protected credential. The user authenticates to the credential store 100 and schedules unattended access to one of the credentials the user owns. The store 100 decrypts the credential using the user's private key, and then generates a single-use encryption key, typically using a symmetric encryption technique. The credential is encrypted using the single-use key and this encrypted copy is stored at an address specified by the user (the drop). The credential store 100 may be configured to allow access to the drop at the time scheduled for the automated action, plus or minus some time window allowing for a margin of error. The user is returned the single-use key. In some embodiments, the user may specify the size of the window, in addition to the time scheduled for the automated action.

In this example embodiment, the user can then hand off the single-use key and the address of the drop to the application that needs access to the credential. At the specified time, the application retrieves a copy of the encrypted credential from the drop, and can use the single-use key to decrypt it. After the time window closes, or the credential is retrieved (whichever comes first), the credential store permanently discards the contents of the drop.

It is to be understood that the above description is intended to be illustrative, and not restrictive. For example, the above-described embodiments may be used in combination with each other. Many other embodiments will be apparent to those of skill in the art upon reviewing the above description. The scope of the invention, therefore, should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A computer program product, the computer program product being tangibly embodied on a non-transitory computer-readable medium and including instructions that, when executed by at least one processor, are configured to:
   insert a credential in a credential store of a credential server computer, the credential encrypted with a public key corresponding to a first user of the credential store;
   receive an instruction to provide the credential;
   decrypt the first credential with a private key of the first user;
   encrypt the first credential with a single-use key;
   store the single-use key-encrypted credential at a location;
   make the single use key-encrypted credential available at the location during a time window;
   allow access to the stored single-use key-encrypted credential at the location during the time window including a time scheduled for an automated action, wherein the size of the time window and the time scheduled for the automated action have been specified by the first user; and
   remove the single use key-encrypted credential from the location upon expiration of the time window.

2. The computer program product of claim 1, further comprising instructions that, when executed by the at least one processor, are configured to:
   provide the single use key to the first user;
   receive the single use key during the time window;
   decrypt the single use key encrypted credential with the single use key; and
   provide the decrypted credential for an automated action.

3. The computer program product of claim 1, further comprising instructions that, when executed by the at least one processor, are configured to:
   configure the time window as instructed by the first user.

4. The computer program product of claim 1, further comprising instructions that, when executed by the at least one processor, are configured to:
   schedule access to the credential within the time window based on information provided by the first user.

5. The computer program product of claim 1, further comprising instructions that, when executed by the at least one processor, are configured to:
   generate the single-use key after decrypting the first credential with the private key of the first user, the single-use key including a single-use encryption key generated by using a symmetric encryption technique.

6. The computer program product of claim 1, further comprising instructions that, when executed by the at least one processor, are configured to:
   generate an encrypted copy of the single-use key-encrypted credential; and
   store the encrypted copy at a location specified by the user.

7. The computer program product of claim 1, wherein the location includes an address specified by the user.

8. The computer program product of claim 1, further comprising instructions that, when executed by the at least one processor, are configured to:
   return the single-use key to the first user.

9. The computer program product of claim 1, wherein removing the single use key-encrypted credential from the location upon expiration of the time window includes permanently discarding or deleting the single-use key-encrypted credential at the location.

10. A computer system including instructions recorded on a non-transitory computer-readable medium and executable by at least one processor, the system comprising:

a credential server configured to cause the at least one processor to:
  insert a credential in a credential store of a credential server computer, the credential encrypted with a public key corresponding to a first user of the credential store;
  receive an instruction to provide the credential;
  decrypt the first credential with a private key of the first user;
  encrypt the first credential with a single-use key;
  store the single-use key-encrypted credential at a location;
  make the single use key-encrypted credential available at the location during a time window;
  allow access to the stored single-use key-encrypted credential at the location during the time window, the time window including a time scheduled for an automated action, wherein the size of the time window and the time scheduled for the automated action have been specified by the first user; and
  remove the single use key-encrypted credential from the location upon expiration of the time window.

11. The system of claim 10, wherein the credential server is further configured to cause the at least one processor to:
  provide the single use key to the first user;
  receive the single use key during the time window;
  decrypt the single use key encrypted credential with the single use key; and
  provide the decrypted credential for an automated action.

12. The system of claim 10, wherein the credential server is further configured to cause the at least one processor to:
  configure the time window as instructed by the first user;
  schedule access to the credential within the time window based on information provided by the user; and
  return the single-use key to the first user.

13. The system of claim 10, wherein the credential server is further configured to cause the at least one processor to:
  generate the single-use key after decrypting the first credential with the private key of the first user, the single-use key including a single-use encryption key generated by using a symmetric encryption technique.

14. The system of claim 10, wherein the location includes an address specified by the first user.

15. The system of claim 10, wherein the credential server is further configured to cause the at least one processor to:
  generate an encrypted copy of the single-use key-encrypted credential; and
  store the encrypted copy at a location specified by the first user.

16. The system of claim 10, wherein removing the single use key-encrypted credential from the location upon expiration of the time window includes permanently discarding or deleting the single-use key-encrypted credential at the location.

17. A computer-implemented method comprising:
  inserting a credential in a credential store of a credential server computer, the credential encrypted with a public key corresponding to a first user of the credential store;
  receiving an instruction to provide the credential;
  decrypting the first credential with a private key of the first user;
  encrypting the first credential with a single-use key;
  storing the single-use key-encrypted credential at a location;
  making the single use key-encrypted credential available at the location during a time window;
  allowing access to the stored single-use key-encrypted credential at the location during the time window including a time scheduled for an automated action, wherein the size of the time window and the time scheduled for the automated action have been specified by the first user; and
  removing the single use key-encrypted credential from the location upon expiration of the time window.

18. The method of claim 17, further comprising:
  providing the single use key to the first user;
  receiving he single use key during the time window;
  decrypting the single use key encrypted credential with the single use key; and
  providing the decrypted credential for an automated action.

19. The method of claim 17, further comprising:
  configuring the time window as instructed by the first user;
  scheduling access to the credential within the time window based on information provided by the user; and
  returning the single-use key to the first user.

* * * * *

UNITED STATES PATENT AND TRADEMARK OFFICE
CERTIFICATE OF CORRECTION

| | | |
|---|---|---|
| PATENT NO. | : 9,094,217 B2 | Page 1 of 1 |
| APPLICATION NO. | : 13/958283 | |
| DATED | : July 28, 2015 | |
| INVENTOR(S) | : David Allen Solin et al. | |

It is certified that error appears in the above-identified patent and that said Letters Patent is hereby corrected as shown below:

In the Claims

In column 10, line 31, in claim 2, delete "an" and insert -- the --, therefor.

In column 12, line 34, in claim 18, delete "he" and insert -- the --, therefor.

In column 12, line 37, in claim 18, delete "an" and insert -- the --, therefor.

Signed and Sealed this
Twelfth Day of April, 2016

Michelle K. Lee
*Director of the United States Patent and Trademark Office*